United States Patent
Funk

[19]

[11] Patent Number: 5,832,463
[45] Date of Patent: Nov. 3, 1998

[54] AUTOMATED SYSTEM AND METHOD FOR CHECKLESS CHECK TRANSACTION

[75] Inventor: Wade L. Funk, Plano, Tex.

[73] Assignee: Electronic Data Systems Corporation, Plano, Tex.

[21] Appl. No.: 623,584

[22] Filed: Mar. 28, 1996

[51] Int. Cl.⁶ .................................................. G06F 17/60
[52] U.S. Cl. ......................... 705/35; 235/375; 235/379; 705/39; 705/45; 902/40
[58] Field of Search .................... 235/375, 379; 705/1, 30, 35, 39, 40, 45; 902/36, 40

[56] References Cited

U.S. PATENT DOCUMENTS

| | | | |
|---|---|---|---|
| 4,015,701 | 4/1977 | Templeton | 197/127 R |
| 4,027,142 | 5/1977 | Paup et al. | 235/61.9 R |
| 4,109,238 | 8/1978 | Creekmore | 340/149 A |
| 4,201,978 | 5/1980 | Nally | 340/146.3 |
| 4,277,689 | 7/1981 | Thomas et al. | 250/567 |
| 4,358,671 | 11/1982 | Case | 235/379 |
| 4,404,649 | 9/1983 | Nunley et al. | 364/900 |
| 4,523,330 | 6/1985 | Cain | 382/7 |
| 4,617,457 | 10/1986 | Granzow et al. | 235/379 |
| 4,672,377 | 6/1987 | Murphy et al. | 340/825.34 |
| 4,678,895 | 7/1987 | Tateisi et al. | 235/379 |
| 4,727,243 | 2/1988 | Savar | 235/379 |
| 4,810,866 | 3/1989 | Lord, Jr. | 235/379 |
| 4,891,503 | 1/1990 | Jewell | 235/380 |
| 5,053,607 | 10/1991 | Carlson et al. | 235/379 |
| 5,054,092 | 10/1991 | LaCaze | 382/11 |
| 5,175,682 | 12/1992 | Higashiyama et al. | 705/45 |
| 5,237,159 | 8/1993 | Stephens et al. | 705/30 |
| 5,245,164 | 9/1993 | Oyama | 235/379 |
| 5,253,345 | 10/1993 | Fernandes et al. | 395/275 |
| 5,310,997 | 5/1994 | Roach et al. | 235/375 |
| 5,383,113 | 1/1995 | Kight et al. | 705/40 |
| 5,412,190 | 5/1995 | Josepson et al. | 705/45 |
| 5,652,786 | 7/1997 | Rogers | 705/39 X |
| 5,677,955 | 10/1997 | Doggett et al. | 235/379 X |
| 5,691,524 | 11/1997 | Josephson | 235/379 |

FOREIGN PATENT DOCUMENTS

| | | |
|---|---|---|
| WO/92/10901 | 6/1992 | WIPO . |
| WO/93/02424 | 2/1993 | WIPO . |

OTHER PUBLICATIONS

Proceedings of the Mediterranean Electrotechnical Conference, May 22–24, 1991, vol. 2, 22 May 1991, Zajc, B; Solina, F., pp. 1264–1267, Franca, V., et al., "A Station for Capture, Processing and Storing of Documents".

IEEE Transactions on Systems, Man and Cybernetics, vol. 23, No. 3, 1 May 1993, pp. 917–927, Ghosh, S.: "Novadib: A Novel Architecture for Asynchronous, Distributed, Real–Time Banking Modeled on Loosely Coupled Parallel Processors".

*Primary Examiner*—Edward R. Cosimano
*Attorney, Agent, or Firm*—Terry J. Stalford; L. Joy Griebenow

[57] ABSTRACT

The automated improved check processing system and method includes a data entry device (200, 202) for receiving checking account information (304, 306, 308) and a check amount (302) of a check (210, 300) provided in a transaction. The transaction may take place at a bank teller window or a point-of-sale. The checking account information and check amount are electronically transmitted to the institution or servicer (208) drawn on for electronic presentment and posting to the proper checking account. Additionally, an image capturer (204) may be used at the time of the transaction to obtain a digitized image of the face of the check. The captured image may then be forwarded electronically to a database, which is readily accessible for research purposes.

25 Claims, 2 Drawing Sheets

AUTOMATED SYSTEM AND METHOD FOR CHECKLESS CHECK TRANSACTION

RELATED APPLICATIONS

This application is related to copending U.S. patent application Ser. No. 08/623,481, filed Mar. 28, 1996, entitled "AUTOMATED SYSTEM AND METHOD FOR POSITIVE CHECK AUTHORIZATION" copending U.S. patent application Ser. No. 08/623,439, filed Mar. 28, 1996, "AUTOMATED SYSTEM AND METHOD FOR POINT-OF SALE (POS) CHECK PROCESSING" and copending U.S. patent application Ser. No. 08/623,480, filed Mar.28, 1996, entitled "AUTOMATED SYSTEM AND METHOD FOR IMPROVED CHECK PROCESSING".

TECHNICAL FIELD OF THE INVENTION

This invention is related in general to the field of document handling systems. More particularly, the invention is related to an automated system and method for checkless check transaction.

BACKGROUND OF THE INVENTION

The typical check processing procedure in use today is long, laborious and tedious, which requires one or more days of processing time and multiple repetitive processing steps. The procedure includes many opportunities for errors to be introduced. The costs associated with check processing, error correction, and returns processing are high.

The typical check processing procedure is shown in FIG. 1 and begins, for example, at a bank teller window. The teller is given one or more checks for each check having a specific dollar amount or check amount. The teller totals the check amounts and credits the customer's account with the amount, as shown in block 100. At the end of the day, the total of all checks received that day by each teller may be totaled. The teller totals are combined to form a bank total.

The bank first encodes the check amounts on the checks, as shown in block 102. The encoding process is performed manually, with an operator physically handling each check, viewing the amount, and then keying it on the face of the check. The check amount is then encoded in magnetic ink on the face of the check in a predetermined field or location, such as the bottom right of the check in alignment with the MICR line. The encoding speed per operator is slow, typically 1,200 to 1,400 checks per hour. Because this processing step relies heavily on the human operator, who must process a large quantity of documents in a short time, it is prone to errors. The check amount may be misread due to poor penmanship and a number of other reasons or the amounts may be entered incorrectly. The encoded checks are then tallied and compared with the total on the deposit ticket. This process is commonly termed "proofing."

The encoded checks are then shipped to a central processing location for the "capturing" step, as shown in block 104. High speed reader sorters process the checks by reading and sorting the checks according to information printed on the MICR (magnetic ink character recognition) line located at the bottom of the check. The MICR information on the check includes the bank number, account number, check serial number, in addition to the encoded check amount. The checks are read and sorted by bank or some other designation according to the transit and routing information also present in the MICR line. Approximately 1 to 1.5% of checks are rejected because the MICR line information is not readable. The rejected checks are manually handled and corrected. A balance of credits and debits is then computed. The sorted checks and a cash letter listing each check and their amounts are then sent to the institutions owning the accounts that the checks are drawn on in a collection and transit process.

The transit process delivers the checks to the bank having the accounts the checks are drawn on, at which place another capturing process commonly termed "inclearing" is performed, as shown in block 106. Inclearing ensures that the checks are actually drawing on that bank's accounts, the amounts are encoded on the checks, the correct settlement amount is given to the other banks, and that the correct amount is finally settled or posted out of the customer's account, as shown in block 108. The checks may then be returned to the checking account owner, as shown in block 110.

It may be seen from the foregoing that the traditional check processing procedure is a time-consuming and tedious process. Each time the check is handled or encoded, an opportunity for error is introduced. As a result, check processing is a very costly procedure for banks and businesses. Although many transactions today are based on cash, credit cards, and debit cards, transactions involving checks are still prevalent in the United States because many Americans are accustomed to using checks as payment. Therefore, it is desirable to permit customers to continue to use checks as their preferred method of payment, but at the same time eliminate the costly and labor intensive traditional check processing system and procedures.

SUMMARY OF THE INVENTION

Accordingly, there is a need for a system and method for a "checkless" check transaction that eliminates repetitive and error-prone steps and the need to handle and pass on the paper checks themselves. As a result, the total check processing time and cost are reduced. Further, banking institutions and businesses involved in cash management practices are informed in advance of presentment what funds are available as a result of deposited checks. Returns processing also becomes a less costly step.

In accordance with the present invention, a system and method for automated checkless check transaction are provided which eliminates or substantially reduces the disadvantages associated with prior systems and processes.

In one aspect of the invention, an automated checkless check transaction system includes an input device receiving checking account information and a check amount of a check drawing on a checking account provided in a transaction. A database coupled to the input device is used for storing the checking account information and check amount. An electronic transaction processor electronically forwards the checking account information and check amount to an institution drawn on by the check, where they are electronically presented and posted to the checking account.

In another aspect of the invention, a method for automated checkless check transaction provides for receiving checking account information and a check amount of a check provided in a transaction, electronically transmitting the received checking account information and check amount to the institution drawn on, and electronically presenting and posting the checking account information and check amount to the checking account.

In yet another aspect of the invention, a method for automated checkless check processing provides for electronically receiving checking account information and a check amount of a check provided in a transaction, electronically presenting the checking account information and check amount, electronically posting to an checking account the check draws on.

BRIEF DESCRIPTION OF THE DRAWINGS

For a better understanding of the present invention, reference may be made to the accompanying drawings, in which.

DETAILED DESCRIPTION OF THE INVENTION

Figure 1:
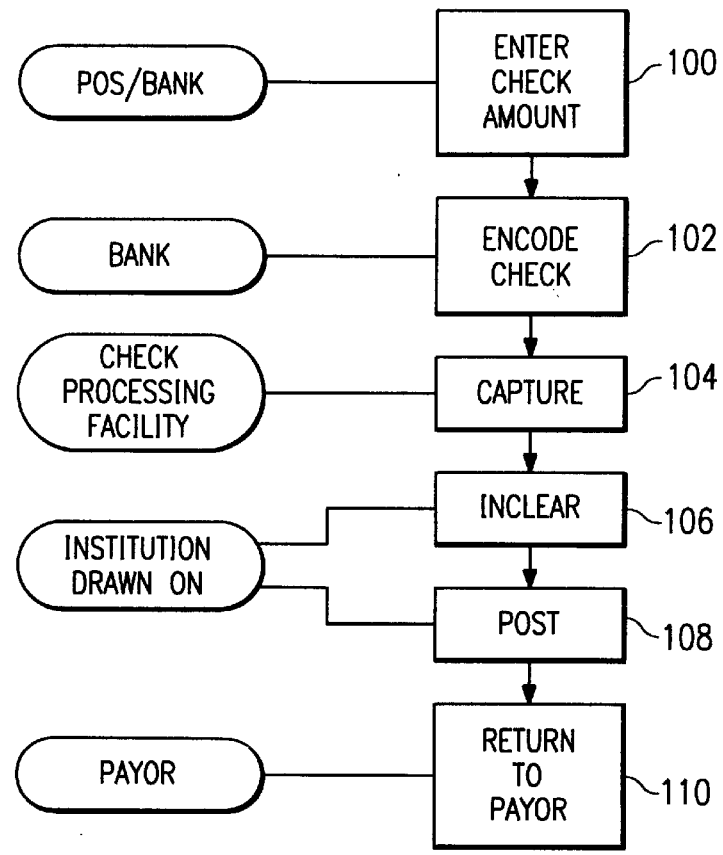
FIG. 1 is a simplified diagram of a typical back office check processing procedure.
Figure 2:
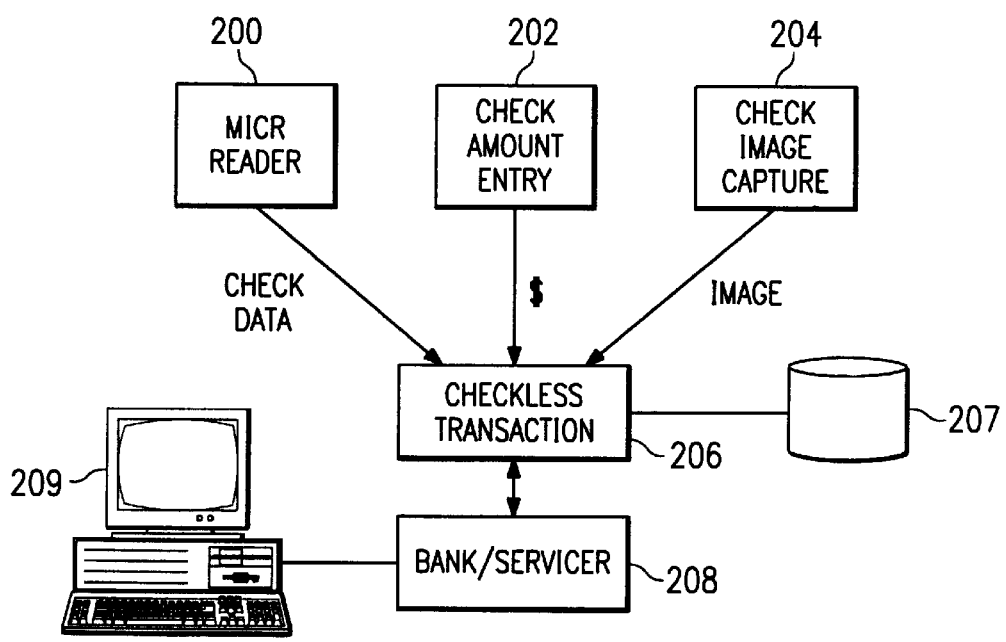
FIG. 2 is a simplified block diagram of a automated checkless check transaction system and method therefor constructed according to the teachings of the present invention.
Figure 3:
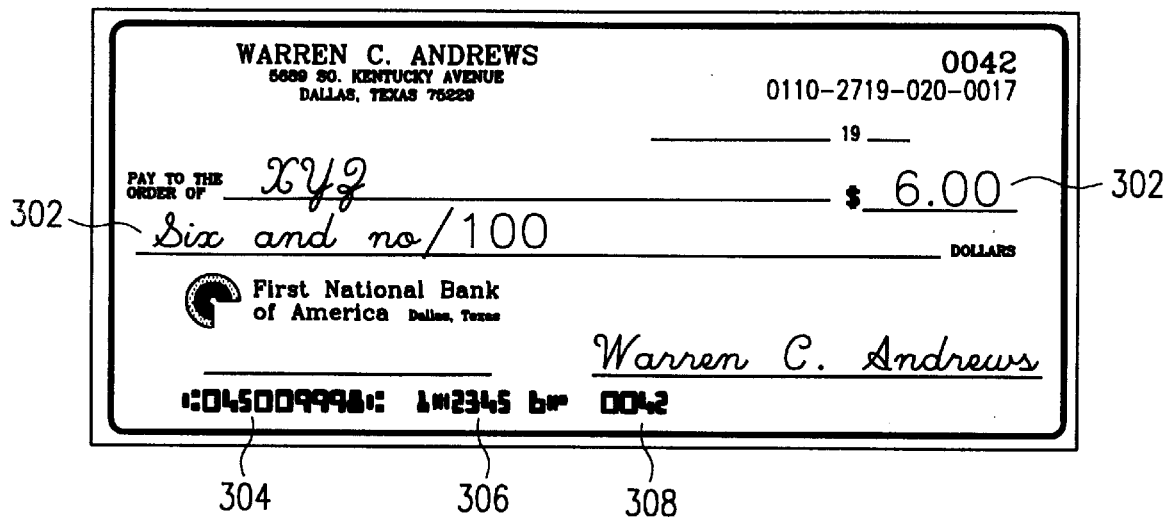
FIG. 3 is a representation of a check.
Figure 4:
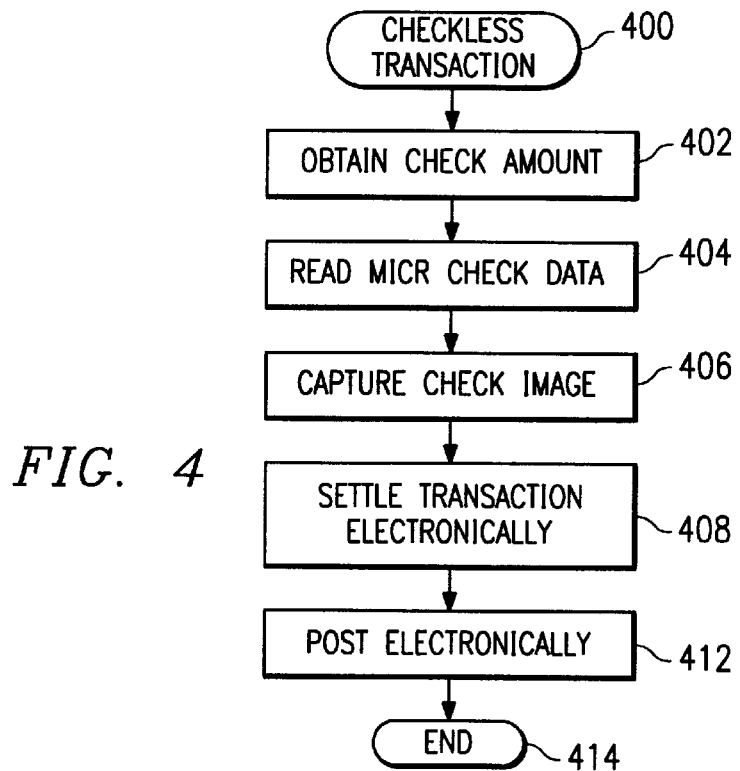
FIG. 4 is a flowchart of an automated checkless check transaction procedure according to the teachings of the present invention.

The preferred embodiment(s) of the present invention is (are) illustrated in FIGS. 2–4, like reference numerals being used to refer to like and corresponding parts of the various drawings.

FIGS. 2 and 4 are a block diagram and a flowchart of automated checkless check transaction system and method therefor, respectively, and both are referenced in the description below. The instant system and method are applicable to bank teller transactions, point-of-sale transactions, as well as any other transactions in which a check is provided as payment or for deposit. Beginning at block 400 of FIG. 4, an automated checkless check transaction according to the present invention begins by obtaining a check amount as written on the check, as shown in block 402. Check amount entry may be performed by the bank teller or cashier on a numerical keypad 202 (FIG. 2) or any other suitable data entry device. The check is also passed through a MICR reader 200 to read the checking account information preprinted on the check, as shown in block 404. FIG. 3 shows a representation of a check 300, with the MICR line located on the bottom of the check. Numerals 304 are transit and routing information, numerals 306 are the checking account number, and numerals 308 are the check serial number. The check amount 302 is written in two fields on the face of the check. In bank teller transaction applications, the depositor's account number, as shown on the deposit slip, may also be read by MICR reader 200. Alternatively, the depositor's account number may be entered manually. A device 204 is further used to capture an image of the face of the check, including the account owner's signature, as shown in block 406. Device 204 may be a digital camera that captures the image of the check and transform it into digital bits of data.

The checking account information, check amount, and the check image are then transmitted electronically to a checkless transaction system 206. The depositor's account information is also transferred, if applicable. All the relevant transaction data may be stored in a database 207 coupled to checkless transaction system 206 for ready accessibility. At the time of presentment, all the relevant information associated with the check is in electronic or digital form, therefore the need for maintaining and handling the paper check becomes obsolete. The paper check may be truncated or marked in some way to indicate that it has been processed and returned to the customer. The customer may then do as he/she pleases with the check. He/she may keep it for a number of years or discard it.

The connection between MICR reader 200, check amount entry device 202, and image capturing device 204 to checkless transaction system 206 and database 207 may be via a dedicated or switched telecommunications line. Although shown as separate entities, MICR reader 200, check amount entry device 202, and image capturing device 204 may be implemented as an integrated input device. Checkless transaction system 206 is in electronic communications with the banking institution or a servicer contracted to perform the checkless transaction function 208. A computer terminal 209 may be coupled to database 207 directly or indirectly through checkless transaction system 206. Checkless transaction system 206 and database 207 may be located on-site at bank/servicer 208 or may be located remotely therefrom. Indeed, the location of each piece of hardware or the execution site of any software need not be limited to any locale, as its location is inconsequential to the operations of the system and performance of the process.

Checkless transaction system 206, having received all relevant transaction data, performs an electronic settlement and electronic post, after which the process ends, as shown in blocks 408, 412 and 414. Presently, there are two known methods for electronic settlement and post. One is automated clearing house or ACH primarily used for payroll direct deposits. Automated clearing house is a series of electronic exchanges of value-based transactions. The other method is the debit card transaction where the account information is electronically forwarded to the banking institution owning the account for immediate posting to the account. Accordingly, checkless transaction system 206 converts the check transaction into an electronic ACH, debit card, or any other suitable transaction where the check amount is electronically presented to the institution drawn on or agent for collection and funding. Because they are well known, details associated with ACH or debit card transactions are not described herein.

In operation, the time-consuming and tedious steps of handling and encoding the checks at various stages of the check processing procedure are eliminated by the automated system and method of the present invention. Because the physical handling of the checks is avoided, significant cost reduction is realized for the savings in labor, machinery, and office space. Errors that may be introduced at this step are also avoided. Research of past check transactions, such as for transaction or legal analysis, may be performed through terminal 209 or any other terminal having access to database 207. A separate image database (not shown) may also implemented to maintain and store only the captured check images for research purposes. It is contemplated that, alternatively, check images may be kept on microfilm for research purposes.

Although the present invention and its advantages have been described in detail, it should be understood that various changes, substitutions and alterations can be made therein without departing from the spirit and scope of the invention as defined by the appended claims.

What is claimed is:

1. An automated point-of-sale transaction system for generating a checkless transaction record from a check tendered at the point-of-sale, comprising:

an input device receiving checking account information and a check amount of a check drawing on a checking account provided in a transaction;

a database coupled to said input device for electronically receiving and storing said checking account information and check amount;

an electronic transaction processor for electronically forwarding said checking account information and check amount to an institution drawn on by said check; and an image capturer for capturing an image of said check.

2. The system, as set forth in claim 1, wherein said input device comprises a MICR reader for reading MICR data line on said check.

3. The system, as set forth in claim 1, wherein said input device comprises a MICR reader for reading MICR data line on a deposit slip being provided with said check, said deposit slip having a depositor's account number preprinted thereon.

4. The system, as set forth in claim 1, wherein said input device comprises at least a numerical keypad for entering said check amount.

5. The system, as set forth in claim 1, wherein said image capturer digitizes said captured check image.

6. The system, as set forth in claim 1, wherein said checking account information includes a routing and transit number and a checking account number.

7. The system, as set forth in claim 1, wherein said checking account information includes a check serial number.

8. The system, as set forth in claim 1, wherein said input device is coupled to said database via a telecommunications line.

9. The system, as set forth in claim 1, wherein said input device is coupled to said electronic transaction processor via a telecommunications line.

10. The system, as set forth in claim 1, further comprising an on-line connection between said institution and said database.

11. The system, as set forth in claim 1, further comprising an on-line connection between said database and a servicer.

12. The system, as set forth in claim 1, wherein said electronic transaction processor comprises an automated clearing house transaction processor.

13. The system, as set forth in claim 1, wherein said electronic transaction processor comprises an automated debit card transaction processor.

14. A method for generating a checkless transaction record at a point-of-sale from a check tendered at the point-of-sale, comprising the steps of:

receiving checking account information and a check amount of a check provided in a transaction, said check drawing on a checking account provided by an institution;

capturing an image of a face of said check, including a signature inscribed thereon; and electronically transmitting said received checking account information and check amount to said institution.

15. The method, as set forth in claim 14, wherein said checking account information receiving step comprises the step of reading a pre-printed MICR line data on said check.

16. The method, as set forth in claim 14, wherein said checking account information receiving step comprises the step of reading a pre-printed MICR depositor's account information on a deposit slip submitted with said check.

17. The method, as set forth in claim 14, wherein said check amount receiving step comprises the step of electronically entering said check amount.

18. The method, as set forth in claim 14, wherein said checking account information receiving step comprises the steps of machine-reading a routing and transit number and a checking account number pre-printed on said check.

19. The method, as set forth in claim 14, wherein said checking account information receiving step comprises the steps of machine-reading a check serial number preprinted on said check.

20. The method, as set forth in claim 14, wherein said electronically transmitting step comprises the step of transmitting said checking account information and check amount via a telecommunications line.

21. The method, as set forth in claim 14, further comprising the step of accessing information stored in said database on-line.

22. The method, as set forth in claim 14, further comprising the steps of:

electronically transmitting said checking account information and check amount to a database; and storing said checking account information and check amount in said database.

23. The method, as set forth in claim 14, further comprising the steps of:

electronically transmitting said check image to an image database; and storing said check image in said image database.

24. The method, as set forth in claim 14, further comprising the step of converting said checkless transaction record to an automated clearing house transaction for electronic presentment.

25. The method, as set forth in claim 14, further comprising the step of converting said checkless transaction record to a debit card transaction for electronic presentment.

* * * * *